Patented Nov. 28, 1944

2,363,607

UNITED STATES PATENT OFFICE 2,363,607

AMINOALKYL SULPHIDE-ALDEHYDE REACTION PRODUCT

Roger A. Mathes, Akron, and Paul C. Jones, Silver Lake, Ohio, assignors to The B. F. Goodrich Company, New York, N. Y., a corporation of New York No Drawing. Application February 2, 1942, Serial No. 429,279

11 Claims. (Cl. 260—72)

This invention relates to a new composition of matter and pertains specifically to the reaction products of the aminoalkyl sulphides with aldehydes.

Our new compounds are useful as fungicides and insecticides, and also as accelerators for the vulcanization of rubber and as reclaiming agents for vulcanized rubber. Although the mechanism of the reaction of their formation is not completely understood, the product is believed to be a condensation polymer.

The term "aminoalkyl sulphide" includes not only the aminoalkyl hydrosulphides (or mercaptans) but also the diaminodialkyl monosulphides and polysulphides containing no more than four sulphur atoms. The alkyl chain between the sulphur and nitrogen atoms may contain no more than three carbon atoms, although it may have a hydrocarbon side-chain such as methyl, ethyl, butyl, phenyl, etc. It has been found that best results are obtained when the amino groups are primary.

Typical of the compounds which may be reacted with aldehydes to produce our new compounds are 1,1'-diaminodimethyl mono-, di-, or tetrasulphide; 2,2'-diaminodiethyl mono-, di-, or tetrasulphide; 2,2'-diaminodipropyl mono-, di-, or tetrasulphide; 2,2'-diethyl-3,3'-diaminodipropyl mono-, di-, or tetrasulphide; 2,2'-diphenyl-3,3'-diaminodipropyl mono-, di-, or tetrasulphide; 3,3'-diaminodipropyl mono-, di-, or tetrasulphide; aminomethyl hydrosulphide; 2-aminoethyl hydrosulphide; 2-aminopropyl hydrosulphide; 2-ethyl 3-aminopropyl hydrosulphide; 2-phenyl 3-aminopropyl hydrosulphide; and other similar compounds.

The aldehydes with which the above-described materials may be reacted to produce our new compounds include all aliphatic aldehydes having a straight or branched chain, saturated or unsaturated, as well as all aromatic aldehydes. Among the aldehydes suitable for use are formaldehyde, acetaldehyde, propionaldehyde, n-butyraldehyde, isobutyraldehyde, n-valeraldehyde, n-capronaldehyde, n-heptaldehyde, acrolein, crotonaldehyde, alpha, beta-dimethyl-acrolein, benzaldehyde, cinnamaldehyde, p-tolyl aldehyde, o-tolyl aldehyde, and other similar compounds.

We have found that two moles of aldehyde react with only one of a diaminodialkyl sulphide, while only one mole of aldehyde reacts with one of aminoalkyl hydrosulphide. Although the mechanism of the reaction is not fully understood, it is believed that the aldehyde carbonyl groups react with the amino groups to form a long chain of alternating carbon and nitrogen atoms.

As specific examples of our invention we describe the preparation of three of these compounds.

Example I

To 24 parts by weight of 2,2'-diaminodiethyl monosulphide and 100 parts of water there is added 56 parts of an aqueous solution containing 11% of formaldehyde. The mixture is kept well stirred during the reaction and the formaldehyde solution is added slowly. An immediate reaction occurs with the evolution of considerable heat, and the product precipitates as a white, rubbery solid.

Example II

To 7.7 parts by weight of solid 2-aminoethyl hydrosulphide is added 4 parts by weight of formaldehyde in 6 parts of water. A vigorous reaction occurs, leading to the precipitation of a white rubbery solid.

Example III

To 7.6 parts by weight of 2,2'-diaminodiethyl disulphide and 10 parts of water is added 3 parts by weight of formaldehyde in 25 parts of water. After a vigorous reaction, a white rubbery material is precipitated.

Each of the foregoing reactions may also be carried out in the absence of any solvent or in a suitable organic solvent such as alcohol or ether, as well as in water. The temperature at which the reaction is carried out is unimportant; since the reaction goes rapidly to completion at room temperatures, it is usually unnecessary to heat the reagents.

Each of the above products is non-thermoplastic and is an active accelerator for the vulcanization of rubber. The following rubber composition was prepared, in which the parts are by weight:

| | |
|---|---|
| Rubber | 100.0 |
| Zinc oxide | 5.0 |
| Sulphur | 3.0 |
| Lauric acid | 3.0 |
| Accelerator | 1.0 |

After vulcanization for 30 minutes at 287° F. each rubber composition containing one of our new compounds as accelerator had a tensile strength of more than 2000 lbs. per sq. in.

Our new compounds may be used to accelerate the vulcanization of any rubber, natural or synthetic, which can be vulcanized with sulphur, such as caoutchouc, balata, gutta percha, latex, artificial rubber isomers, and copolymers of conjugated diene hydrocarbons with other copolymerizable monomers, e. g., copolymers of butadiene with either styrene, acrylonitrile, methyl acrylate, methyl methacrylate, or the like. The presence of any of the usual pigments, fillers, dyes, softeners, antioxidants, other accelerators, etc., has no deleterious effect on the accelerating action of our new compounds. It is desirable to use a fatty acid, such as lauric or stearic acid, or a metal salt of such acid, in conjunction with our new accelerators, although the presence of such material is not essential.

Although our new compounds have other uses, they are particularly valuable as accelerators; for that reason we have described in detail this application of these compounds.

Although we have herein described specific embodiments of our invention, we do not intend to limit ourselves solely thereto, but only to the scope of the appended claims.

We claim:

1. A composition of matter comprising the reaction product of an aldehyde with an aminoalkyl hydrosulphide containing no more than three carbon atoms in the alkyl chain between the sulphur and nitrogen atoms, and in which the alkyl chain contains no substituent groups other than hydrogen and hydrocarbon groups.

2. A composition of matter comprising the reaction product of an aldehyde with a di-(aminoalkyl) monosulphide containing no more than three carbon atoms in the alkyl chain between the sulphur and nitrogen atoms, and in which the alkyl chains contain no substituent groups other than hydrogen and hydrocarbon groups.

3. A composition of matter comprising the reaction product of an aldehyde with a di-(aminoalkyl) polysulphide containing no more than four sulphur atoms, and no more than three carbon atoms in the alkyl chains between the sulphur and nitrogen atoms, and in which the alkyl chains contain no substituent groups other than hydrogen and hydrocarbon groups.

4. A composition of matter comprising the reaction product of formaldehyde with an aminoalkyl hydrosulphide containing no more than three carbon atoms in the alkyl chain between the sulphur and nitrogen atoms, and in which the alkyl chain contains no substituent groups other than hydrogen and hydrocarbon groups.

5. A composition of matter comprising the reaction product of formaldehyde with a di-(aminoalkyl) monosulphide containing no more than three carbon atoms in the alkyl chain between the sulphur and nitrogen atoms, and in which the alkyl chains contain no substituent groups other than hydrogen and hydrocarbon groups.

6. A composition of matter comprising the reaction product of formaldehyde with a di-(aminoalkyl) polysulphide containing no more than four sulphur atoms, and no more than three carbon atoms in the alkyl chains between the sulphur and nitrogen atoms, and in which the alkyl chains contain no substituent groups other than hydrogen and hydrocarbon groups.

7. A composition of matter comprising the reaction product of formaldehyde with 2-aminoethyl hydrosulphide.

8. A composition of matter comprising the reaction product of formaldehyde with 2,2'-diaminodiethyl monosulphide.

9. A composition of matter comprising the reaction product of formaldehyde with 2,2'-diaminodiethyl disulphide.

10. A composition of matter comprising the reaction product of an aldehyde with an aminoalkyl sulphide containing no more than four sulphur atoms, and no more than three carbon atoms in the alkyl chain between the sulphur and nitrogen atoms, in which the alkyl chain contains no substituent groups other than hydrogen and hydrocarbon groups, and in which the sulphide group is attached to at least one such aminoalkyl group and to no other group except hydrogen.

11. A composition of matter comprising the reaction product of formaldehyde with an aminoalkyl sulphide containing no more than four sulphur atoms, and no more than three carbon atoms in the alkyl chain between the sulphur and nitrogen atoms, in which the alkyl chain contains no substituent groups other than hydrogen and hydrocarbon groups, and in which the sulphide group is attached to at least one such aminoalkyl group and to no other group except hydrogen.

ROGER A. MATHES.
PAUL C. JONES.